United States Patent
Tartaro et al.

(10) Patent No.: US 11,194,036 B2
(45) Date of Patent: Dec. 7, 2021

(54) SYSTEMS AND METHODS FOR AUTOMATIC MOTION DETECTION

(71) Applicant: Inxpect S.p.A., Brescia (IT)

(72) Inventors: Andrea Tartaro, Brescia (IT); Alessio Degani, Brescia (IT); Marco Garatti, Brescia (IT)

(73) Assignee: INXPECT S.P.A., Brescia (IT)

( * ) Notice: Subject to any disclaimer, the term of this patent is extended or adjusted under 35 U.S.C. 154(b) by 297 days.

(21) Appl. No.: 16/294,232

(22) Filed: Mar. 6, 2019

(65) Prior Publication Data

US 2019/0277959 A1    Sep. 12, 2019

(30) Foreign Application Priority Data

Mar. 9, 2018 (IT) .................... 102018000003397

(51) Int. Cl.
*G01S 13/56* (2006.01)
*G01S 13/88* (2006.01)
(Continued)

(52) U.S. Cl.
CPC ............ *G01S 13/56* (2013.01); *G01S 13/886* (2013.01); *G08B 13/2491* (2013.01);
(Continued)

(58) Field of Classification Search
CPC ........ G01S 13/536; G01S 13/56; G01S 13/32; G01S 13/538; G01S 13/886; G08B 13/2491; G08B 29/185
See application file for complete search history.

(56) References Cited

U.S. PATENT DOCUMENTS

| 2003/0234347 A1* | 12/2003 | Akagi | ..................... F16P 3/144 |
| | | | 250/221 |
| 2010/0052972 A1* | 3/2010 | Kasano | .................. G01S 13/589 |
| | | | 342/28 |

(Continued)

FOREIGN PATENT DOCUMENTS

| GB | 1 312 285 A | 4/1973 |
| WO | 2018/035460 A1 | 2/2018 |

OTHER PUBLICATIONS

Italian Search Report and Written Opinion dated Nov. 20, 2018, in IT Application No. 102018000003397, 10 pages.

*Primary Examiner* — Timothy X Pham
(74) *Attorney, Agent, or Firm* — MH2 Technology Law Group, LLP

(57) ABSTRACT

A method for detecting motion may include: performing at least one scanning cycle on a monitored space using a radar apparatus; detecting and identifying at least one moving object in the monitored space, including detecting an actual displacement value for each moving object detected inside the monitored space between a detection cycle and a subsequent detection cycle; providing a threshold value of maximum allowable displacement associated with every moving object detected inside the monitored space between the detection cycle and the subsequent detection cycle; locating at least one semi-static zone in the monitored space, the at least one semi-static zone corresponding to a portion of the monitored space that surrounds at least one semi-static object; and generating an alarm signal only when, in the monitored space, at least one moving object situated outside the at least one semi-static zone is detected.

9 Claims, 2 Drawing Sheets

(51) Int. Cl.
*G08B 13/24* (2006.01)
*G08B 29/18* (2006.01)
*G01S 13/536* (2006.01)
*G01S 13/538* (2006.01)
*G01S 13/32* (2006.01)

(52) U.S. Cl.
CPC ............ *G08B 29/185* (2013.01); *G01S 13/32* (2013.01); *G01S 13/536* (2013.01); *G01S 13/538* (2013.01)

(56) References Cited

U.S. PATENT DOCUMENTS

| | | | |
|---|---|---|---|
| 2010/0177199 A1* | 7/2010 | Chen | G06T 7/246 348/208.4 |
| 2018/0365975 A1* | 12/2018 | Xu | G01V 3/12 |
| 2019/0212432 A1* | 7/2019 | DiPoala | G01P 13/00 |

* cited by examiner

SYSTEMS AND METHODS FOR AUTOMATIC MOTION DETECTION

CROSS-REFERENCE TO RELATED APPLICATION(S)

This application claims priority under 35 U.S.C. § 119 from Italian Patent Application No. 102018000003397, filed on Mar. 9, 2018, in the Italian Patent and Trademark Office ("IPTO"), the entire contents of which are incorporated herein by reference.

FIELD OF THE INVENTION

The present invention relates to a system and a method for automatic detection of moving objects in a space monitored by at least one radar transceiver.

In particular, the present invention finds application in the field of intrusion detection alarm systems.

DESCRIPTION OF THE PRIOR ART

Intrusion detection alarm systems are used in home or work environments with both stationary and moving objects, such as fans and potted plants. Such moving objects can cause false alarms, depending on the intrusion detection technique. In particular, certain motion detection-based alarm systems can estimate the Radar Cross Section (RCS) of the object. The RCS is essentially a measure of the overall reflectivity of the object and provides information about the size of the moving object. As a result, a RCS threshold may be set to discriminate moving objects that may be deemed harmless by their size, from objects that may be considered a threat. Nevertheless, it shall be understood that, in thermal gradient detection-based alarm systems, irrespective of the size of the moving objects, the alarm will not be generated if the moving objects have a sufficiently low temperature, which will avoid the generation of false positives. Conversely, in motion detection-based alarm systems, zones with moving objects having a RCS above the threshold must be excluded from detection, and be defined as blind spots.

Frequency-Modulated Continuous Wave (FMCW) radar systems are motion detection systems that can determine the distance and spatial position of a moving object in a monitored space. Particularly, a radar transceiver emits a radio signal over a monitored space and receives the signal reflected from the object. A control unit connected to the transceiver processes the transmitted signal and the reflected signal and determines the distance of the target object from the radar transceiver and, if a plurality of transceivers are provided, the 2D and 3D spatial position depending on the number of the transceivers and their arrangement in space.

Problem of the Prior Art

In the prior art, false alarms caused by moving objects with a RCS above the threshold in the monitored area are avoided by arranging motion-detection sensors in such positions as to avoid detection of such moving objects in their field of view. This arrangement may lead to the drawback of inadequate allocation of monitoring sensors, resulting in the creation of blind spots in which intrusion movements cannot be detected.

The problem of avoiding false alarms is discussed in document GB 1312285, proposing the prevention of alarm signals for detected objects being particularly fast, slow, close or far with respect to the detection system. This is achieved by controlling the frequency and the voltage of the involved signals.

Document WO 2018035460 describes that it is possible to store an area wherein the objects will be signaled, while at the exterior thereof no alarm is provided.

SUMMARY OF THE INVENTION

In view of the above, the technical purpose of the present invention is to provide a radar motion detection system and method that can overcome the drawbacks of the prior art.

The object of the present invention is to provide a radar motion detection system and method that can ensure more reliable intrusion detection.

Advantages of the Invention

A radar motion-detection system and an associated method can be provided by the present invention, which achieve a significant reduction in the probability of false alarms, by proper detection and management of movements in the monitored space, and by limited generation of blind spots caused by inadequate radar sensor positioning.

A radar motion detection system and method can be provided by the present invention, which achieve automatic identification of the zones with semi-statically moving objects and accordingly tolerate semi-static movements by objects identified in these zones of the monitored space, without requiring manual configuration.

BRIEF DESCRIPTION OF THE DRAWINGS

The features and advantages of the present invention will result from the following detailed description of a possible practical embodiment, illustrated as a non-limiting example in the set of drawings, in which.

DETAILED DESCRIPTION

The present invention relates to a method of detecting motion by way of a motion detection system.

Figure 1:
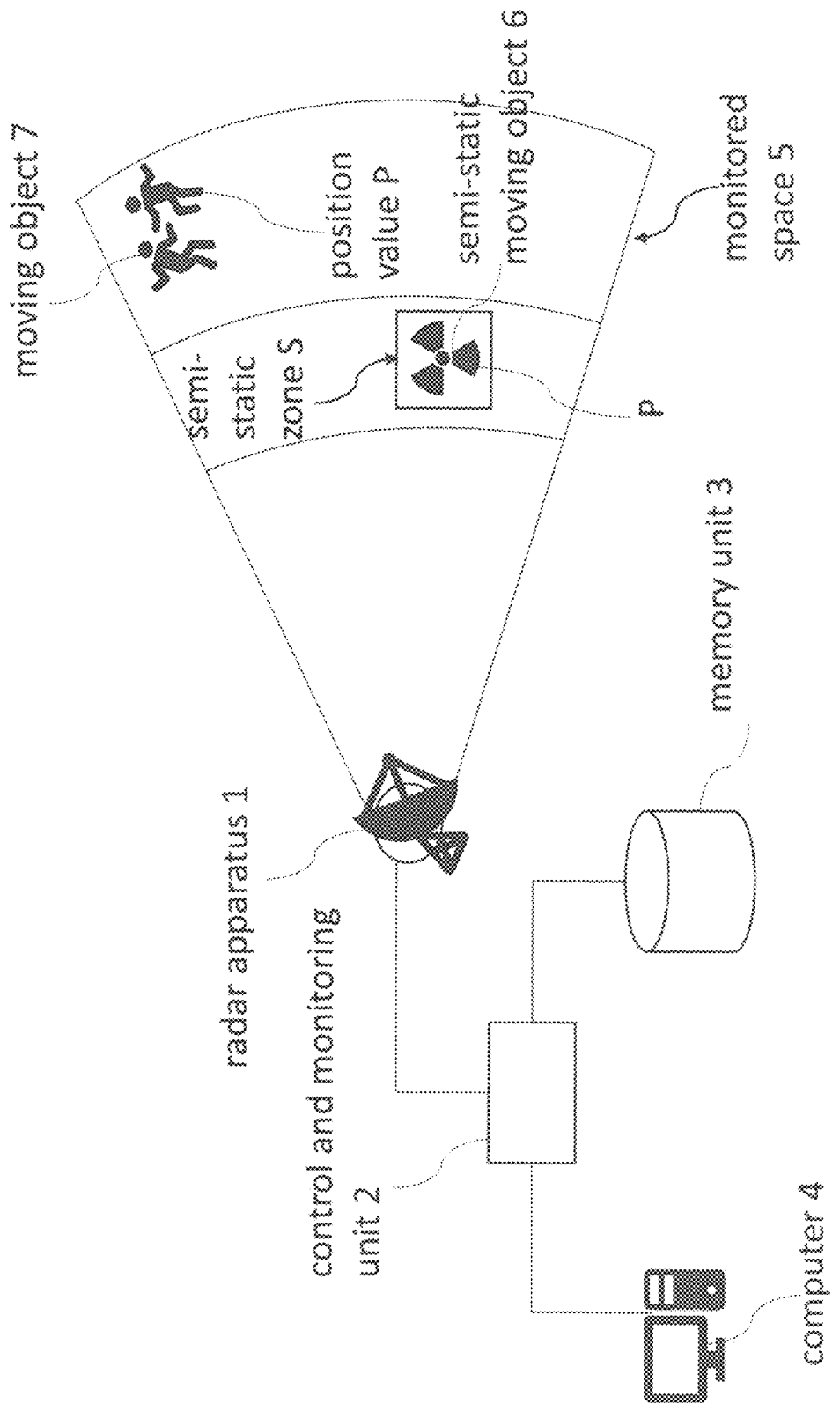
FIG. 1 shows a schematic view of a motion-detection system of the present invention.
Figure 2:
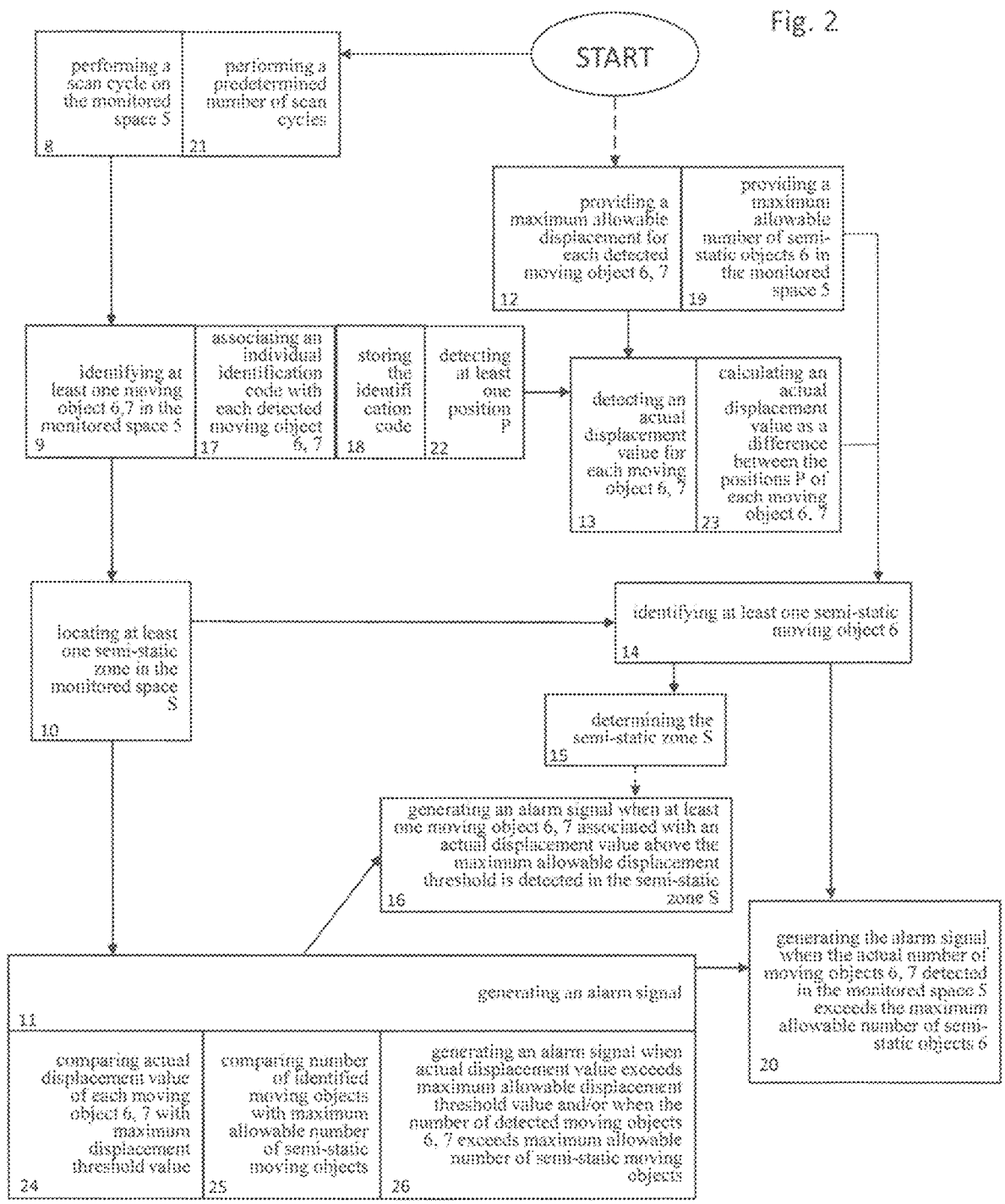
FIG. 2 shows a block diagram representing the steps of the motion-detection method of the present invention.

The motion detection system comprises at least one radar apparatus 1 having at least one radar transceiver. Referring to FIG. 1, the radar apparatus 1 is configured to transmit frequency-modulated continuous wave (FMCW) radio signals, which cover a predetermined field of view. The radar apparatus 1 is also configured to receive the radio signals reflected from one or more targets impinged upon by the radar signals emitted by the radar apparatus. In particular, each radar transceiver of the radar apparatus 1 comprises a radio signal-emitting antenna and a radio signal-receiving antenna. In other words, each radar transceiver is configured to transmit frequency modulated continuous wave radio signals via a transmitting antenna.

The motion detection system comprises a control and monitoring unit 2 in signal communication with the radar apparatus 1 for electronically controlling the transmission and reception of signals, as well as for electronically processing the transmit and receive signals. Preferably, the control and monitoring unit 2 may be programmed via a computer 4.

According to a preferred arrangement of the invention, the motion detection system comprises a memory unit 3 which is configured to store data handled and processed by the control and monitoring unit 2.

It shall be noted that the motion detection system of the present invention is configured to carry out all the steps of the method as described below.

The motion detection system and method of the present invention particularly find application in intrusion detection alarm systems when a radio signal-reflecting object in semi-static movement is situated in the space 5 that is monitored by the radar apparatus 1.

As used herein, a semi-static moving object 6 is intended as an object that rotates, oscillates or moves relative to an initial reference position without covering a significant distance. A semi-static moving object 6 may be also designated as an object that moves constantly or at a given frequency, or possibly an object that is temporarily stationary or changes its position relative to the transceiver between two successive detections separated by a time interval.

When at least one moving object 6, 7 is situated in the monitored space 5 of the radar apparatus 1, the control and monitoring unit 2 processes the transmitted signals and the signals reflected from the moving object 6, 7, determining the distance of the moving object 6, 7 from the transceiver of the radar apparatus 1 and/or its position in the monitored space 5.

FIG. 1 shows a motion-detection system according to one of the possible embodiments of the present invention, which emits, receives, and processes the radio signals transmitted and reflected in the monitored space 5 of the radar apparatus 1, in which at least one semi-static moving object 6 is situated. The control and monitoring unit 2 processes the signals transmitted by and reflected from the at least one semi-static moving object 6 by determining the distance from the transceiver of the radar apparatus 1 and/or the position of the at least one semi-static moving object 6 in the monitored space 5 for each detection instant, and storing the processed signals in the memory unit 3. When a plurality of moving objects 6, 7 are present, the control and monitoring unit 2 can individually locate the plurality of moving objects 6, 7, determine and store the positions of the objects in the monitored space 5 for each detection instant, and/or the distance of each object from the transceiver of the radar apparatus 1, and/or the displacement and path between first and second detection instants, and/or the volumetric space swept by each moving object 6, 7 as it moves between first and second detection instants.

The present invention also relates to a method of detecting motion when semi-static moving objects 6 are present, which is adapted to be implemented with a motion detection system such as an intrusion detection system as described above.

The motion detection method comprises the step of performing 8 at least one scan cycle on the monitored space 5 by means of the radar apparatus 1, to provide the control and monitoring unit 2 with data concerning the presence of any moving object 6, 7 detected in the monitored space.

The motion detection method also comprises the step of detecting and identifying 9 at least one semi-static moving object 6 in the monitored space 5 by processing the signals emitted and received by the radar apparatus 1. Preferably, each moving object 6, 7 in the monitored space 5 is identified and its position, path, displacement, and/or swept volume are determined for each scan cycle. More preferably, such data is stored in the memory unit 3.

Then, the method includes a step of locating 10 at least one semi-static zone S in the monitored space 5, which corresponds to the portion of space that surrounds at least one semi-static object 6. In this step a user may instruct the system about the positions of semi-static moving objects 6 in the volume, e.g. by connecting with the control and monitoring unit 2 via a computer 4. By this arrangement the step of locating semi-static zones S allows the system to identify the volumetric portions in which movements are tolerated during motion detection.

The detection method includes a step of generating 11 an alarm signal only when at least one moving object 7 is detected in the monitored space outside each semi-static zone S that has been located, irrespective of whether moving objects 6, 7 are present in the semi-static zones S. Advantageously, this step increases the reactivity of the monitoring system, because once the semi-static zones have been located, the signals from these semi-static zones are not processed by the control and monitoring unit 2, and the latter can emit an alarm signal as soon as it detects a movement in the monitored space outside such semi-static zones S. In other words, a user can selectively exclude processing of the signals associated with the space that has been swept by moving objects 6, 7 located in the semi-static zones S.

Also, advantageously, the motion detection method can detect and identify moving objects 6,7 in the monitored space 5 of the radar system, by determining the presence of semi-static moving objects 6 and defining semi-static zones S in which the semi-static moving objects 6 move. Thus, an alarm signal can be generated for each movement detected outside the semi-static zones S. Namely, the detection method can selectively exclude certain portions of the volume, surrounding the semi-static moving objects 6, from the monitored space 5. Thus, the motion detection method tolerates the movement of semi-static moving objects 6 in certain positions of the volume, which increases the reactivity of the system in generating an alarm signal as soon as a movement is detected outside the semi-static zones S. With reference to the prior art, the exclusion of certain portions of the volume from the monitored space 5 advantageously avoids the need to physically reposition the transceivers of the radar apparatus 1. This is because the method can reconfigure the monitored space 5 when needed without changing the arrangement of the transceivers of the radar apparatus 1 of the motion detection system.

According to a preferred solution, the detection method includes the step of providing 12 a maximum allowable displacement threshold value associated with every moving object 6, 7 detected in the monitored space 5 between one detection cycle and the next. Such maximum allowable displacement threshold is imparted to the detection system to allow discrimination between a semi-static moving object 6 and a different moving object 7 possibly threating the security of the monitored space 5. This displacement threshold may be set or preset to a preferred value depending on application requirements. The step of detecting and identifying 9 at least one moving object 6, 7 in the monitored space 5 also comprises a sub-step of detecting 13 an actual displacement value for each moving object 6, 7 detected inside the monitored space 5 between one detection cycle and the next. Preferably, the data concerning the displacements of each moving object 6, 7 is stored in the memory unit 3.

Preferably, the step of locating 10 at least one semi-static zone S in the monitored space 5 comprises the sub-step of identifying 14 at least one semi-static moving object 6 whose actual displacement value is lower than the allowable displacement threshold. In particular, the control and monitoring unit 2 compares the actual displacement value of each moving object 6, 7 with the maximum allowable displacement value for a predetermined number of scan cycles. It shall be noted that the predetermined number of scan cycles is a predetermined number that can be selected by the user via the computer 4. At the end of the predetermined number of scan cycles, the moving objects 6, 7 that satisfy the inequality, i.e. the objects whose actual displacement value is lower than the allowable displacement threshold, are identified as semi-static moving objects 6. Advantageously, the detection method can achieve a better detection selectivity in the monitored space 5.

Still preferably, the step of locating 10 at least one semi-static zone S comprises the sub-step of determining 15 the at least one semi-static zone S as a localized volume of the monitored space 5 in which a located semi-static moving object 6 has moved during the second number of detection cycles.

According to a further preferred solution, said step of generating 11 an alarm signal comprises the sub-step of generating 16 an alarm signal when at least one moving object 6, 7 associated with an actual displacement value above the maximum allowable displacement threshold is detected in the semi-static zone S. Thus, the motion detection system will generate an alarm even when the displacement of a moving object 6, 7 in a semi-static zone exceeds the maximum allowable displacement that has been set. By this arrangement, the system increases monitoring selectivity, as the control and monitoring unit 2 can detect the displacements of each moving object 6, 7 in the monitoring space 5, without excluding detection in the semi-static zones S.

According to a preferred embodiment of the invention, the step of detecting and identifying 9 at least one semi-static moving object 6 in the monitored space 5 comprises the sub-step 17 of associating an individual identification code with each detected moving object 6, 7. Preferably, the motion detection method includes a further sub-step of storing 18 the individual identification code associated with each detected moving object 6, 7 in the memory unit 3. More preferably, if multiple moving objects 6, 7 are present, the control and monitoring unit 2 may identify the individual identification code associated with each moving object 6, 7 and store it in the memory unit 3 to individually detect and track the displacements of each moving object 6, 7 for a predetermined number of scan cycles.

According to a preferred arrangement of the invention, the step of providing 12 a maximum allowable displacement threshold value for each detected moving object 6, 7 comprises a sub-step 19 of providing a maximum allowable number of semi-static moving objects 6 in the monitored space 5. In other words, the user uses the computer 4 to select a maximum number of semi-static moving objects 6 that he/she finds acceptable in the monitored space 5, to preset the desired security state. Preferably, the step of generating 11 the alarm signal comprises a sub-step of generating 20 the alarm signal when the actual number of moving objects 6, 7 detected in the monitored space 5 exceeds the maximum allowable number of semi-static moving objects 6. More preferably, the user may instruct the detection system about the number of semi-static moving objects 6 in the monitored space 5 according to the environment or the changes of the environment to be monitored to thereby increase the reactivity of the danger detection system, by generating an alarm signal as soon as the number of detected semi-static moving objects 6 exceeds the maximum number of allowable semi-static moving objects 6.

Advantageously, the plurality of steps and sub-steps as described in the following paragraphs allow the motion detection system to recognize by itself the semi-static zones S in the monitored space 5 according to the behavior of the individual objects, and according to the settings of certain parameters by an installing user.

Still preferably, the step of performing 8 at least one scan cycle on the monitored space 5 comprises the sub-step of performing 21 a predetermined number of scan cycles. This number of scan cycles is set or preset to allow the surveillance system enough time to detect objects in the monitored space 5 and to gather enough information to locate the semi-static zones S. More preferably, the step of detecting and identifying 9 at least one moving object 6, 7 in the monitored space 5 includes the sub-step of detecting 22 at least one position value P associated with a respective moving object 6, 7 for a predetermined number of detection instants, each detection instant being associated with a respective scan cycle of the predetermined number of scan cycles. This means that, for each detection instant from cycle 1 to the $N^{th}$ cycle, each detected moving object 6, 7 is associated with the corresponding position value P. Therefore, each position occupied with time by each individually detected and identified moving object 6, 7 is monitored for each scan cycle of the number of preset scan cycles.

Preferably, the sub-step of detecting 13 an actual displacement value for each moving object 6, 7 comprises the sub-step of calculating 23 an actual displacement value as a difference between the position values P of each moving object 6, 7 detected at one detection instant and at the next detection instant, the actual displacement value being indicative of the portion of space swept by each moving object 6, 7 from one detection instant to the next detection instant.

In the latter embodiment, the step of generating 11 an alarm signal comprises the sub-step of comparing 24 the actual displacement value of each moving object 6, 7 with the maximum displacement threshold value for each detection instant for a number of scan cycles. Furthermore, the step of generating 11 an alarm signal comprises the sub-step of comparing 25 the actual number of identified moving objects 6, 7 with the maximum allowable number of semi-static moving objects 6. Finally, the step of generating 11 an alarm signal comprises the sub-step of generating 26 an alarm signal when the actual displacement value exceeds the maximum allowable displacement threshold value and/or when the number of detected moving objects 6, 7 exceeds the maximum allowable number of semi-static moving objects 6.

Preferably, the method comprises the step of storing each detected position P and the actual displacement value associated with each detected moving object 6, 7. More preferably, the detected position value P is associated with the individual identification index of each moving object 6, 7 detected in the monitored space 5.

Preferably, the method also comprises the step of delimiting the local space volume of the semi-static zone S as the portion of space swept by each moving object 6, 7 at the detection instant that corresponds to the last scan cycle of the predetermined number of scan cycles. Advantageously, the motion detection system can associate a volume located in the monitored space 5 with the corresponding space swept by each moving object 6, 7 during the scan cycles, thereby identifying and automatically recognizing the presence and positions of the semi-static zones S in which motion is tolerated. It shall be noted that, once the presence and positions of semi-static zones S in the monitored space 5 have been recognized, the motion detection system may determine whether the semi-static zones S shall be excluded from detection, thereby simplifying the data processing procedure and the analysis speed of the control and monitoring unit 2, which will be able to promptly identify any intrusion. Alternatively, the motion detection system may decide to proceed with motion analysis also in the semi-static zones 5, but it will set a maximum allowable displacement threshold value for the moving objects 6, 7 in these zones. For example, after a first number of scan cycles, the system has automatically located, with no action by the user, the semi-static zones S in the monitored space 5. For each cycle subsequent to the first number of scan cycles, the control and monitoring unit 2, which has completed the steps of identifying, locating, and tracking, will focus on generating an alarm signal when a movement is detected in the monitored space 5, outside the semi-static zones S. Advantageously, the danger warning reactivity of the alarm system is greatly increased. Also, the automatic recognition of the semi-static zones S advantageously prevents the occurrence of false alarms generated by semi-static moving objects 6 in the monitored space 5 which do not constitute a real threat to security.

Those skilled in the art will obviously appreciate that a number of changes and variants as described above may be made to fulfill particular requirements, without departure from the scope of the invention, as defined in the following claims.

The invention claimed is:

1. A method for detecting motion by way of a motion detection system comprising a radar apparatus which is in signal communication with a monitoring and control unit, wherein the radar apparatus is configured to generate an electromagnetic signal suitable for illuminating a predetermined monitored space, the method comprising the following steps:
    performing at least one scanning cycle on the monitored space using the radar apparatus;
    detecting and identifying at least one moving object in the monitored space, the step of detecting and identifying the at least one moving object in the monitored space comprising a sub-step of detecting an actual displacement value for each moving object detected inside the monitored space between a detection cycle and a subsequent detection cycle;
    providing a threshold value of maximum allowable displacement associated with every moving object detected inside the monitored space between the detection cycle and the subsequent detection cycle;
    locating at least one semi-static zone in the monitored space, the at least one semi-static zone corresponding to a portion of the monitored space that surrounds at least one semi-static object, the step of locating the at least one semi-static zone in the monitored space comprising the following sub-steps:
        identifying at least one semi-static object which is moving, rotating, or oscillating in the monitored space, having an actual displacement value relative to an initial reference position equal to or less than the threshold value of maximum allowable displacement between the detection cycle and the subsequent detection cycle for a predetermined number of consecutive scanning cycles, wherein the at least one semi-static object moves constantly or at a given frequency, or that is temporarily stationary or changes its position relative to a transceiver of the radar apparatus between the detection cycle and the subsequent detection cycle for a predetermined number of consecutive scanning cycles; and
        delimiting the at least one semi-static zone as a localized volume of the monitored space in which the at least one semi-static object has moved during the predetermined number of consecutive scanning cycles; and
    generating an alarm signal only when, in the monitored space, at least one moving object situated outside the at least one semi-static zone is detected.

2. The method according to claim 1, wherein the step of generating the alarm signal comprises the sub-step of generating the alarm signal when at least one moving object associated with an actual displacement value that is greater than the threshold value of the maximum allowable displacement is detected in the at least one semi-static zone.

3. The method as claimed in claim 1, wherein the step of detecting and identifying the at least one object moving in the monitored space comprises the sub-step of associating an individual identification code to each detected moving object.

4. The method as claimed in claim 3, further comprising the step of:
    storing in a memory unit of the motion detection system the individual identification code associated with each detected moving object.

5. The method according to claim 1, wherein the step of providing the threshold value of the maximum allowable displacement associated with every moving object detected comprises the sub-step of providing a maximum allowable number of semi-static objects in the monitored space, and
    wherein the step of generating the alarm signal comprises a sub-step of generating the alarm signal when, in the monitored space, an actual number of moving objects is detected which is greater than the maximum allowable number of the semi-static objects.

6. The method according to claim 5, wherein the step of performing the at least one scanning cycle on the monitored space using the radar apparatus comprises the sub-step of performing a predetermined number of scanning cycles,
    wherein the step of detecting and identifying the at least one moving object in the monitored space comprises the sub-step of detecting at east one position associated with a respective moving object for a predetermined number of detection instants, wherein each detection instant is associated with a respective scanning cycle of the predetermined number of scanning cycles,
    wherein the sub-step of detecting the actual displacement value for each moving object comprises the sub-step of calculating the actual displacement value as a difference between positions of each moving object detected at an initial instant and at a subsequent instant, wherein the actual displacement value is indicative of a portion of space swept by each moving object for each detection instant, and
    wherein the step of generating the alarm signal comprises the following sub-steps:
        comparing the actual displacement value of each moving object in a given detection instant to the threshold value of maximum allowable displacement;
        comparing a number of identified moving objects to the maximum allowable number of semi-static objects; and
        generating the alarm signal when the actual displacement value is greater than the threshold value of maximum allowable displacement and/or when the actual number of moving objects detected is greater than the maximum allowable number of the semi-static objects.

7. The method according to claim 1, wherein the step of performing the at least one scanning cycle on the monitored space using the radar apparatus comprises the sub-step of performing a predetermined number of scanning cycles, and wherein the step of detecting and identifying the at least one moving object in the monitored space comprises the sub-step of detecting at least one position associated with a respective moving object for a predetermined number of detection instants, wherein each detection instant is associated with a respective scanning cycle of the predetermined number of scanning cycles.

8. The method according to claim 7, wherein the sub-step of detecting the actual displacement value for each moving object detected comprises the sub-step of calculating the actual displacement value as a difference between positions of each moving object detected at an initial instant and at a subsequent instant, and wherein the actual displacement value is indicative of a portion of space swept by each moving object for each detection instant.

9. A motion detection system configured to carry out the motion detection method according to claim 1, the motion detection system comprising:

a radar apparatus configured to generate an electromagnetic signal suitable for illuminating a predetermined monitored space to thereby detect at least one moving object;

a monitoring and control unit in signal communication with the radar apparatus and configured to identify at least one moving object detected in the monitored space; and a memory unit in signal communication with the monitoring and control unit.

* * * * *